(12) United States Patent
Klinstein et al.

(10) Patent No.: US 10,807,314 B1
(45) Date of Patent: Oct. 20, 2020

(54) ULTRASONIC WELDING SYSTEMS AND METHODS USING DUAL, SYNCHRONIZED HORNS ON OPPOSITE SIDES OF PARTS TO BE JOINED

(71) Applicant: Dukane IAS, LLC, St. Charles, IL (US)

(72) Inventors: Leo Klinstein, Glenview, IL (US); Charles Leroy Leonard, St. Charles, IL (US); Matthew James Dittrich, Chagrin Falls, OH (US); John Putnam Hays, IV, Creston, IL (US); Petr Vasko, Velke Prilepy (CZ)

(73) Assignee: DUKANE IAS, LLC, St. Charles, IL (US)

( * ) Notice: Subject to any disclaimer, the term of this patent is extended or adjusted under 35 U.S.C. 154(b) by 0 days.

(21) Appl. No.: 16/863,662

(22) Filed: Apr. 30, 2020

(51) Int. Cl.
*B32B 37/00* (2006.01)
*B29C 65/08* (2006.01)
*B29C 65/00* (2006.01)
*B29L 31/00* (2006.01)

(52) U.S. Cl.
CPC .......... *B29C 65/08* (2013.01); *B29C 66/9513* (2013.01); *B29L 2031/7166* (2013.01)

(58) Field of Classification Search
USPC ...................................................... 156/73.1
See application file for complete search history.

(56) References Cited

U.S. PATENT DOCUMENTS

| | | | |
|---|---|---|---|
| 5,183,523 A * | 2/1993 | Rinehart | B29C 66/3452 156/367 |
| 6,502,372 B1 | 1/2003 | Kaneko | |
| 7,523,775 B2 * | 4/2009 | Matsumura | B23K 20/10 156/359 |

OTHER PUBLICATIONS

Widmann PM-Series, "Manufacturing a Variety of Pouches by Using the Ultrasonic Technology" retrieved on Jul. 20, 2020 at https://www.widmann-maschinen.com/en/machines/series-produced-machines/packaging (7 pages).

* cited by examiner

*Primary Examiner* — James D Sells
(74) *Attorney, Agent, or Firm* — Nixon Peabody LLP

(57) ABSTRACT

An ultrasonic system and method for sealing a complex interface, such as a Gable top, having multiple and a variety of layers across the interface, or an oval or round spout having a complex geometry. The system includes two ultrasonic horns arranged opposite a gap between which the interface is provided. The frequency and phase of the ultrasonic energy are synchronized as the energy is applied simultaneously while the interface is pressed between a jaw and the energy is applied to both sides of the interface. Only one application of the frequency- and phase-synchronized ultrasonic energy is required to hermetically seal all the layers of the interface together.

20 Claims, 16 Drawing Sheets

ULTRASONIC WELDING SYSTEMS AND METHODS USING DUAL, SYNCHRONIZED HORNS ON OPPOSITE SIDES OF PARTS TO BE JOINED

BACKGROUND OF THE INVENTION

Certain types of packaging or containers can have complex seal interfaces with a varying number of layers to be sealed along the seal interface. The seal in some applications must be hermetic, air tight, or must contain a liquid without any leaks. Conventional techniques to seal these interfaces are extremely wieldy, expensive, and can require multiple passes over the same interface to complete the seal, requiring a lengthy amount of time for each item to be sealed. Some preparation or manipulation of the item and/or its seal interface must also be carried out before the seal can be formed. These preparations or manipulations cause additional delays in the sealing process.

Typically, these items can be composed of or coated with a plastic film or a polyethylene material (e.g., liquid paperboard), such as pillow packs, flow wraps, and cartons or other containers, such as milk cartons having so-called gable tops. To seal these items, conventional approaches can require different machines to seal different materials, take a relatively long time and can require multiple passes to create a leak-proof seal, suffer from inconsistent seals and can produce failed seals that produce channel leaks, produce waste, are incapable of addressing certain seal shapes, particularly narrow seals, and require a lot of maintenance due in part to their complexity and number of moving parts.

In traditional ultrasonic welding, one ultrasonic stack is energized, and the part is pressed between the stack and a stationary anvil. For certain applications, this single-stack configuration poses challenges where the parts have multiple layers or other unusual geometries, and can require multiple passes over the same part to create a high quality seal or weld.

Gable top or other packaging sealing applications having an uneven number of layers (such as 4-2-4-5 layers across a width of an interface to be sealed) exemplifies the inadequacy of using a single-stack horn. Suppose each carton layer absorbs or attenuates about 10% of the applied ultrasonic energy/amplitude. By the time traditional welding gets through 4-5 layers, there will only be about 50% of the ultrasonic energy/amplitude remaining at the last layer, which is not enough to produce a reliable seal. If the force or amplitude or time were increased to compensate for this energy loss, there is a risk of over-welding the 2-layer section and possibly burning the external surface leaving a visual artifact on the product.

Round or oval interfaces, like spouts or ports, are very challenging to seal using conventional ultrasonic welding techniques. Usually, conventional techniques require many horns (e.g., up to four) and multiple repeating movements of the horns, e.g., three steps or more) to seal these types of parts. These configurations are bulky, complex, and introduce delay into a manufacturing process by having to repeat ultrasonic movements multiple times to carry out their welding or sealing task. A need exists, therefore, for a solution that solves these and other problems. Aspects of the present disclosure are directed to fulfilling these and other needs using ultrasonic energy in a one-pass application to create a seal on a part, such as on a Gable top of a carton.

SUMMARY OF THE INVENTION

According to an aspect of the present disclosure, an ultrasonic welding system for sealing together multiple layers of a part includes: a first ultrasonic welding stack including a first horn and a second ultrasonic stack including a second horn, the first horn having a first welding surface, the second horn having a second welding surface opposing the first welding surface to define a gap therebetween, wherein the gap is configured to receive therein the part to be sealed along a section of the part; an actuator assembly operatively coupled to the first and second ultrasonic welding stacks and configured to cause the first welding surface to move relative to the second welding surface; one or more controllers operatively coupled to the first and second ultrasonic welding stacks and to the actuator assembly, the one or more controllers operatively being configured to: cause the actuator assembly to urge the first and second welding surfaces of the first and second horns toward one another until contacting the part, and thereby apply toward the part a first ultrasonic energy via the first horn and a second ultrasonic energy via the second horn such that a frequency and a phase of the first and second ultrasonic energies are synchronized as the first and second ultrasonic energies are applied on both sides of the part simultaneously, to thereby the seal the part along the section.

The frequency can be between 15 kHz and 70 kHz. The part can be a gable top having a different number of layers arranged across a longitudinal direction of the gable top. Alternately, the part can be a gable top having a different number of layers arranged across a direction transverse to a longitudinal direction of the gable top. An amplitude of the first ultrasonic energy can be the same as or can differ from an amplitude of the second ultrasonic energy.

The system can further include a first generator generating the first ultrasonic energy and a second generator generating the second ultrasonic energy, wherein the first generator is designated as a master generator that auto-locks feedback from the first ultrasonic welding stack using a phase lock loop to itself and instructs the second generator that acts as a slave generator to match its own phase and frequency feedback to that generator by the first generator.

The part can be composed of a material that includes a polymeric film, a thermoplastic material, a non-woven material, a metal foil, or a metal. The part can be a pillow pack having an end portion having a different number of layers arranged across a longitudinal direction of the end portion. The part can include a different number of layers that includes, along the section of the part to be sealed, a first number of layers in a first portion of the section and a second number of layers in a second portion of the section, the first number differing from the second number.

The apparatus can be a pillow pack or a carton or a pouch. The part can be a spout to be sealed to a pouch.

The first horn can be a rotary horn and the second horn can be a rotary horn. The controller can be further configured to rotate the first horn and the second horn at the same rotational speed while applying the synchronized first and second ultrasonic energies to the part.

The first generator can include a first output and a second output, the first output can be operatively connected to a first transducer and the second output can be operatively connected to a second transducer. The first transducer can be operatively connected to the first horn and the second transducer can be operatively connected to the second horn.

An area of the part to be joined by far-field welding can be at least ¼ inch or 6 mm away from the first welding surface of the first horn or from the second welding surface of the second horn.

According to another aspect of the present disclosure, an ultrasonic welding method for sealing together multiple layers of a part includes the steps of: moving a first welding surface of a first horn toward an opposing a second welding surface of a second horn to close a gap between the first welding surface and the second welding surface until the first and second welding surfaces contact a part to be sealed along a section thereof; responsive to contacting the part, applying to the part a first ultrasonic energy via the first horn and a second ultrasonic energy via the second horn such that a frequency and a phase of the first and second ultrasonic energies are synchronized as the first and second ultrasonic energies are applied on both sides of the part simultaneously, to thereby seal the part along the section, the first and second horns being arranged to point toward one another.

The method can further include, responsive to sealing the layers together, retracting the first horn relative to the second horn to release the part. The frequency can be between 15 kHz and 70 kHz. The moving can be caused by a rotational movement of the first horn rotating at the same speed as a rotational movement of the second horn.

An amplitude of the first ultrasonic energy can be the same as or can differ from an amplitude of the second ultrasonic energy. An apparatus having at least one seal applied by the methods disclosed herein is also contemplated.

DETAILED DESCRIPTION

A surprising result discovered by the inventors of the inventions disclosed herein is that a very good hermetic seal (against air and liquid) can be formed using dual horns that deliver energy at ultrasonic frequencies when their frequencies and phases are synchronized. Advantageously, only one pass is needed to form the seal, and the seal can be formed in as little as one second or less with a single application of ultrasonic energy (e.g., 0.35 sec). The seals have produced no leaks and work especially well when the interface to be sealed has a complex number of layers to be sealed together. For example, so-called Gable tops on milk cartons and the like can have a seal interface involving two layers on one end of the interface, up to four layers in another section of the interface, and possibly five layers at the other end of the interface, depending on how the carton blank is folded. The sealing problem becomes particularly challenging when trying to seal across an interface where different layers are present in different sections of the areas along the interface to be sealed.

Figure 2:
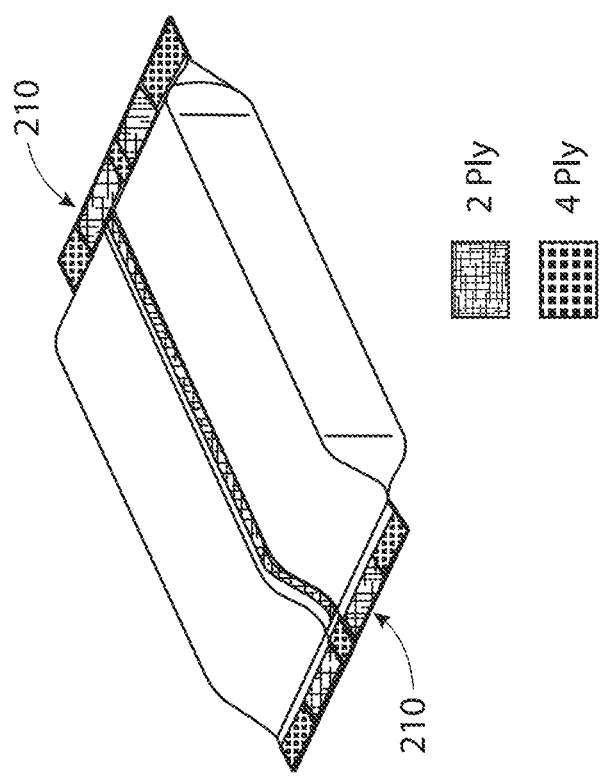
FIG. 2 illustrates a pillow pack and the number of different layers to be sealed along its ends to create a hermetically sealed package.
Figure 2:
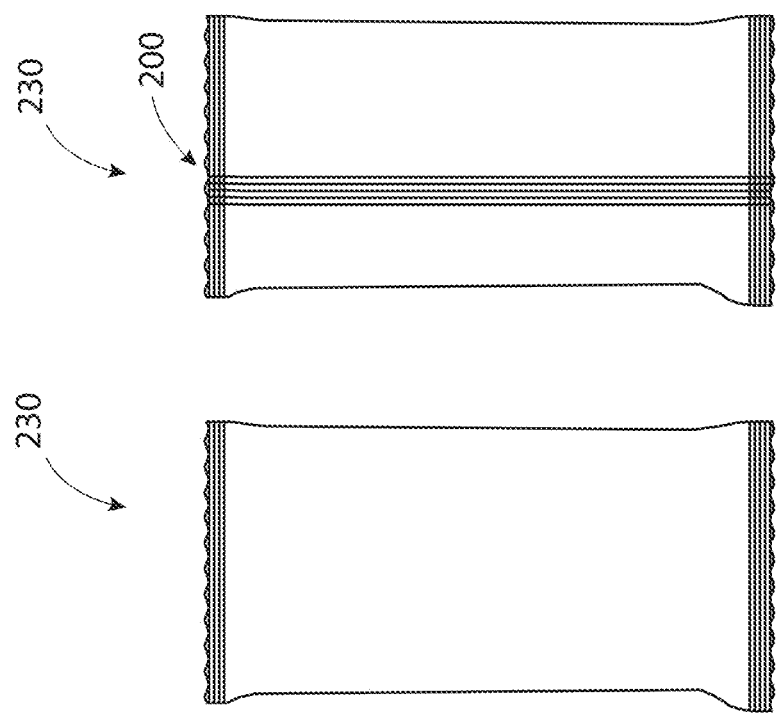
Figure 6A:
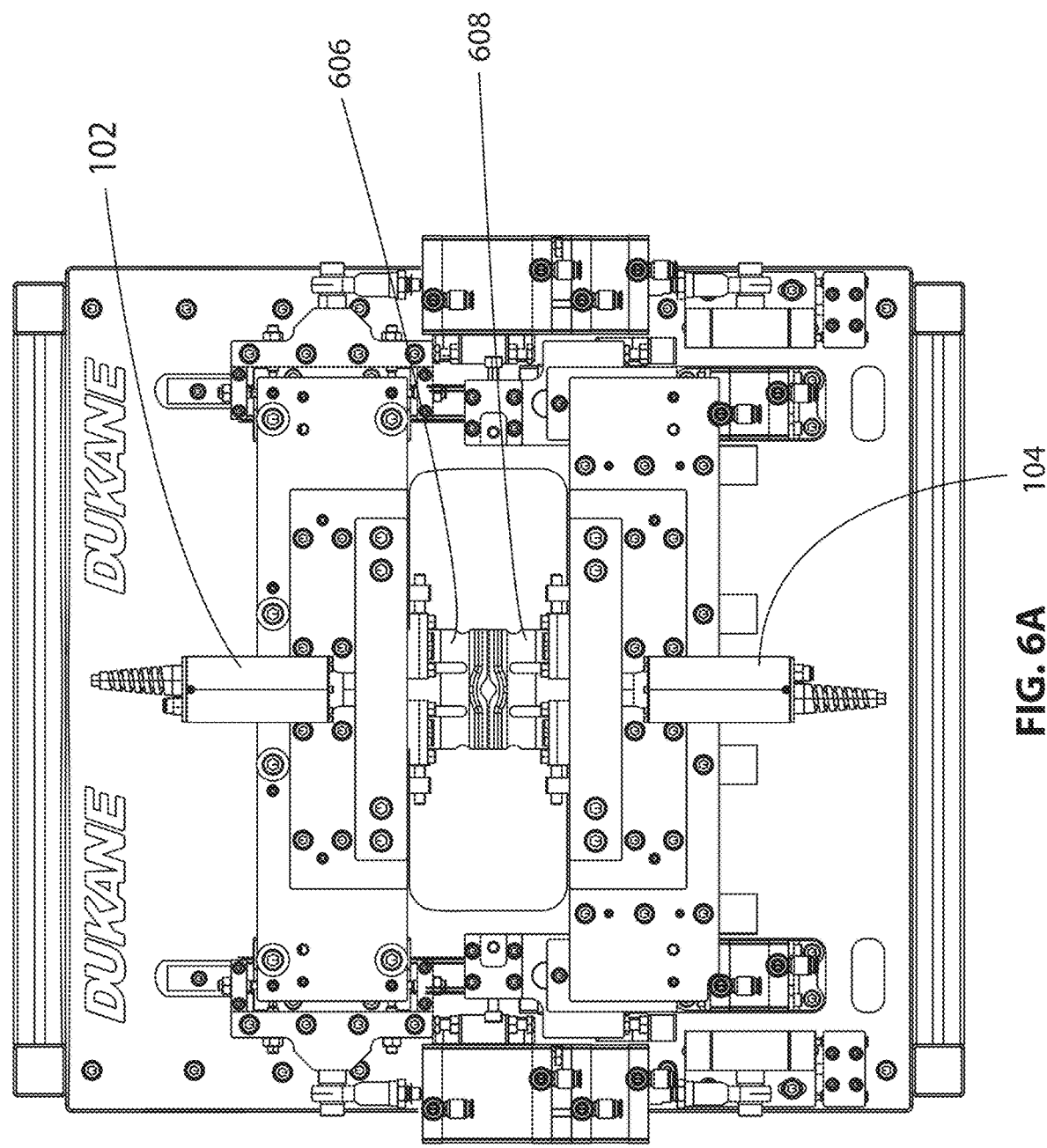
FIG. 6A illustrates another example configuration to seal or join a spout or non-flat structure to a part using synchronized ultrasonic energy applied to dual opposing horns simultaneously.
Figure 6B:
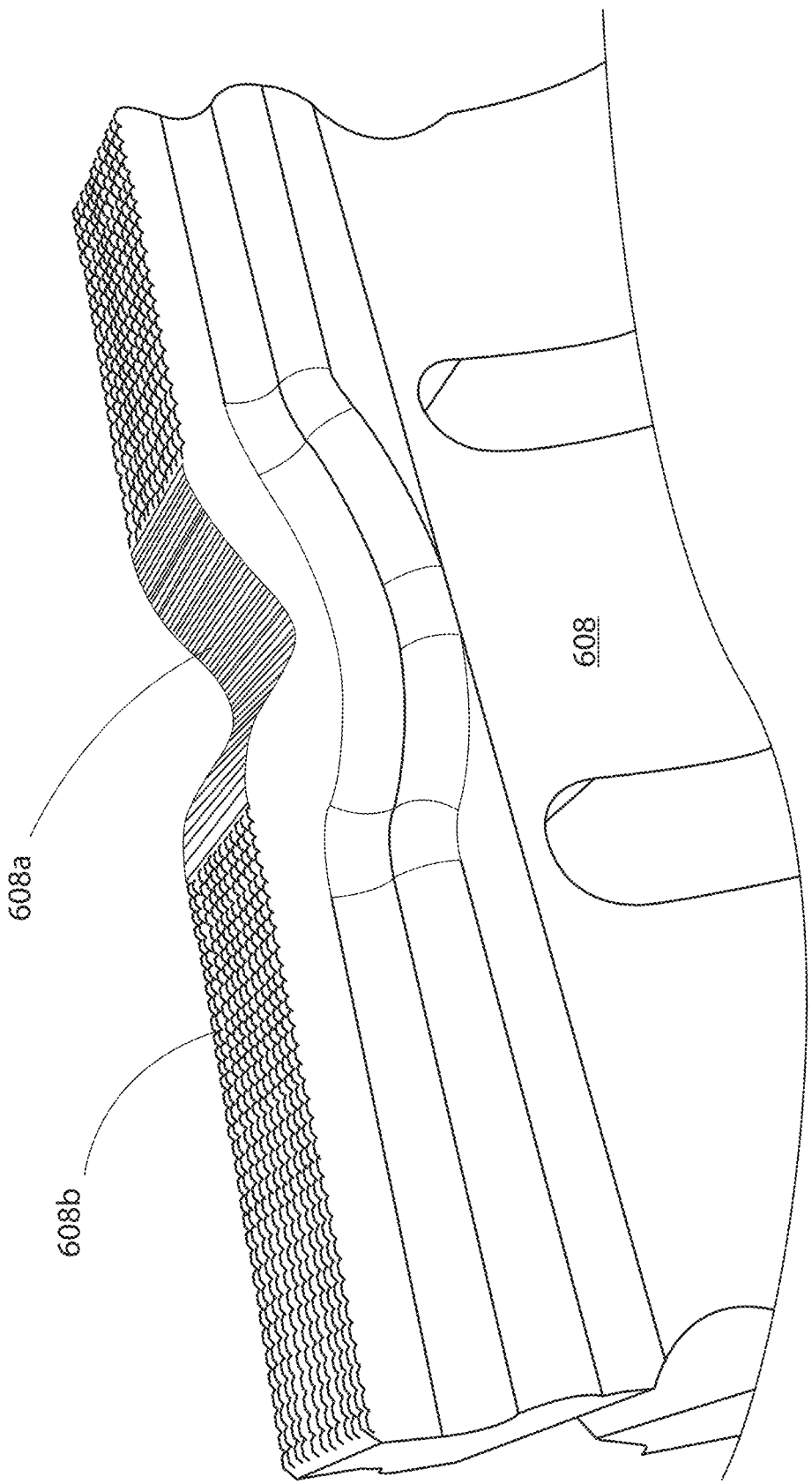
FIG. 6B is a top, perspective view of a top welding surface of a bottom one of the horns showing a grooved pattern corresponding to a spout or non-flat structure to be joined using synchronized ultrasonic energy applied to dual opposing horns simultaneously.
Figure 6C:
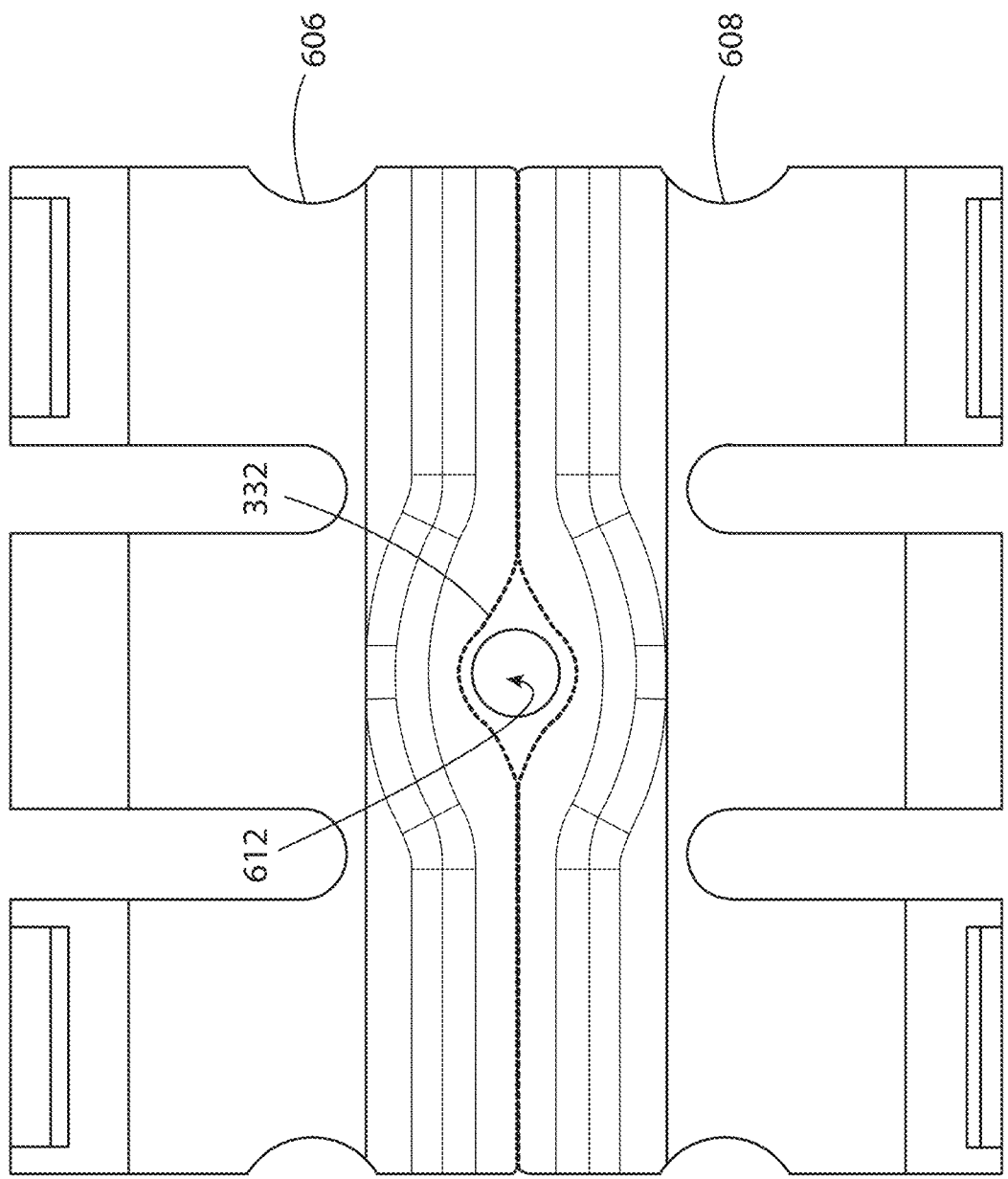
FIG. 6C is a front view of the two horns shown in FIG. 6A having a part, such as a spout, inserted between an opening that exists between the two horns when they are pressed against one another.

Examples of these complex interfaces to be sealed can be seen in FIGS. 2-3 and 6C.

Ultrasonic transducers are devices that convert energy into sound, typically in the nature of ultrasonic vibrations—sound waves that have a frequency above the normal range of human hearing. One of the most common types of ultrasonic transducers in modern use is the piezoelectric ultrasonic transducer which converts electric signals into mechanical vibrations. Piezoelectric materials are materials, traditionally crystalline structures and ceramics, which produce a voltage in response to the application of a mechanical stress. Since this effect also applies in the reverse, a voltage applied across a sample piezoelectric material will produce a mechanical stress within the sample. Suitably designed structures made from these materials can therefore be made that bend, expand, or contract when a current is applied thereto.

Many ultrasonic transducers are tuned structures that contain piezoelectric ("piezo") ceramic rings. The piezo ceramic rings are typically made of a material, such as lead zirconium titanate ceramic (more commonly referred to as "PZT"), which have a proportional relationship between their applied voltage and mechanical strain (e.g., thickness) of the rings. The supplied electrical signal is typically provided at a frequency that matches the resonant frequency of the ultrasonic transducer. In reaction to this electrical signal, the piezo ceramic rings expand and contract to produce large-amplitude vibrational motion. For example, a 20 kHz ultrasonic transducer typically produces 20 microns of vibrational peak-to-peak (p-p) amplitude. The electrical signals are often provided as a sine wave by a power supply that regulates the signal so as to produce consistent amplitude mechanical vibrations and protect the mechanical structure against excessive strain or abrupt changes in amplitude or frequency.

Typically, the ultrasonic transducer is connected to an optional ultrasonic booster and a sonotrode (also commonly called a "horn" in the ultrasonic welding industry), both of which are normally tuned to have a resonant frequency that matches that of the ultrasonic transducer. The optional ultrasonic booster, which is structured to permit mounting of the ultrasonic transducer assembly (or "stack" as it is commonly called), is typically a tuned half-wave component that is configured to increase or decrease the vibrational amplitude passed between the converter (transducer) and sonotrode (horn). The amount of increase or decrease in amplitude is referred to as "gain." The horn, which is oftentimes a tapering metal bar, is structured to augment the oscillation displacement amplitude provided by the ultrasonic transducer and thereby increase or decrease the ultrasonic vibration and distribute it across a desired work area.

Typically, all of the mechanical components used in an ultrasonic transducer assembly must be structured so that they operate at a single resonant frequency that is near or at a desired operating frequency. In addition, the ultrasonic transducer assembly must often operate with a vibrational motion that is parallel to the primary axis (i.e., the central longitudinal axis) of the assembly. The power supply for the stack generally operates as part of a closed-loop feedback system that monitors and regulates the applied voltage and frequency.

For certain applications, particularly those involving welding of thermoplastic parts together, ultrasonic welding technology is highly desirable due to its consistency (particularly when the stack's movement is controlled by a servo-driven motor), speed, weld quality, and other advantages. The inventors have discovered that leveraging dual horns synchronously applying ultrasonic energy to a complex interface having a variety of layers across the area to be sealed surprisingly produces an excellent airtight and hermetic seal in one pass, by matching the phase and frequency of the energy delivered through both horns and applying the energy on either side of the complex interface. Power to each horn is controlled by an ultrasonic generator that delivers consistent and reliable energy even in noisy environments to the horn. An example of such an ultrasonic generator suitable for use in connection with the systems and methods described herein is disclosed in U.S. Pat. No. 7,475,801, the entirety of which is incorporated herein by reference, and a suitable ultrasonic generator is commercially available from Dukane under the brand name iQ™. Each horn can be driven by an iQ™ ultrasonic generator or similar generator capable of outputting a consistent and reliable ultrasonic energy signal through the horn to a part or parts to be welded or joined. Because the components and configuration of an ultrasonic generator would be well known to the skilled person familiar with ultrasonic welding, for the sake of brevity, a detailed description of these is omitted because they are not essential for an understanding of the inventions disclosed herein. Each horn (or technical the horn's transducer) can be powered by a separate power supply, or they can be powered by a single power supply with dual power outputs that can be independently controlled. The entire pass or cycle time from applying the force to the horns 106, 108 to removing the ultrasonic energy can be very fast, e.g., 0.35 seconds or even faster with a higher amplitude of energy.

The force imparted to a part to be sealed can be adjustable within a reasonable range, such as +/−50% from the nominal value for each size machine or part. The part's geometry, material, and expectations for the finished product define choices in operating frequency (e.g., as a general rule, lower frequency and higher amplitude for larger parts, higher frequency and lower amplitude for smaller parts). In ultrasonic welding there are essentially three parameters that need to be adjusted to get a high quality and consistent weld for a specific part: a) amplitude; b) force; and c) weld time (time during which ultrasonic energy is applied to the part). Most applications call for a short weld time to maximize yield, particularly in packaging applications where hundreds or thousands of packages are filled and sealed per hour. Amplitude is often limited by stresses in the horn, so there is a practical limit as to how high the amplitude can be set. This leaves force, but as force is increased to get a good weld quickly, too much force might constrain the movement of the ultrasonic stack and it can be damaged or destroyed. Or the stack can get stuck akin to jaws closing as a brick wall. If the brick wall does not yield, then the movement of the stack will be difficult to maintain. A Gable top requires more force, whereas a pillow pack requires less force applied by the horns. Thin films would require a different ratio of amplitude and force, which can also be based on the material and speed requirements. The systems and methods disclosed herein allow for much more flexibility and significantly open the process window, meaning that the process becomes more robust and less sensitive to the usual production variables compared to conventional approaches.

Figure 1:
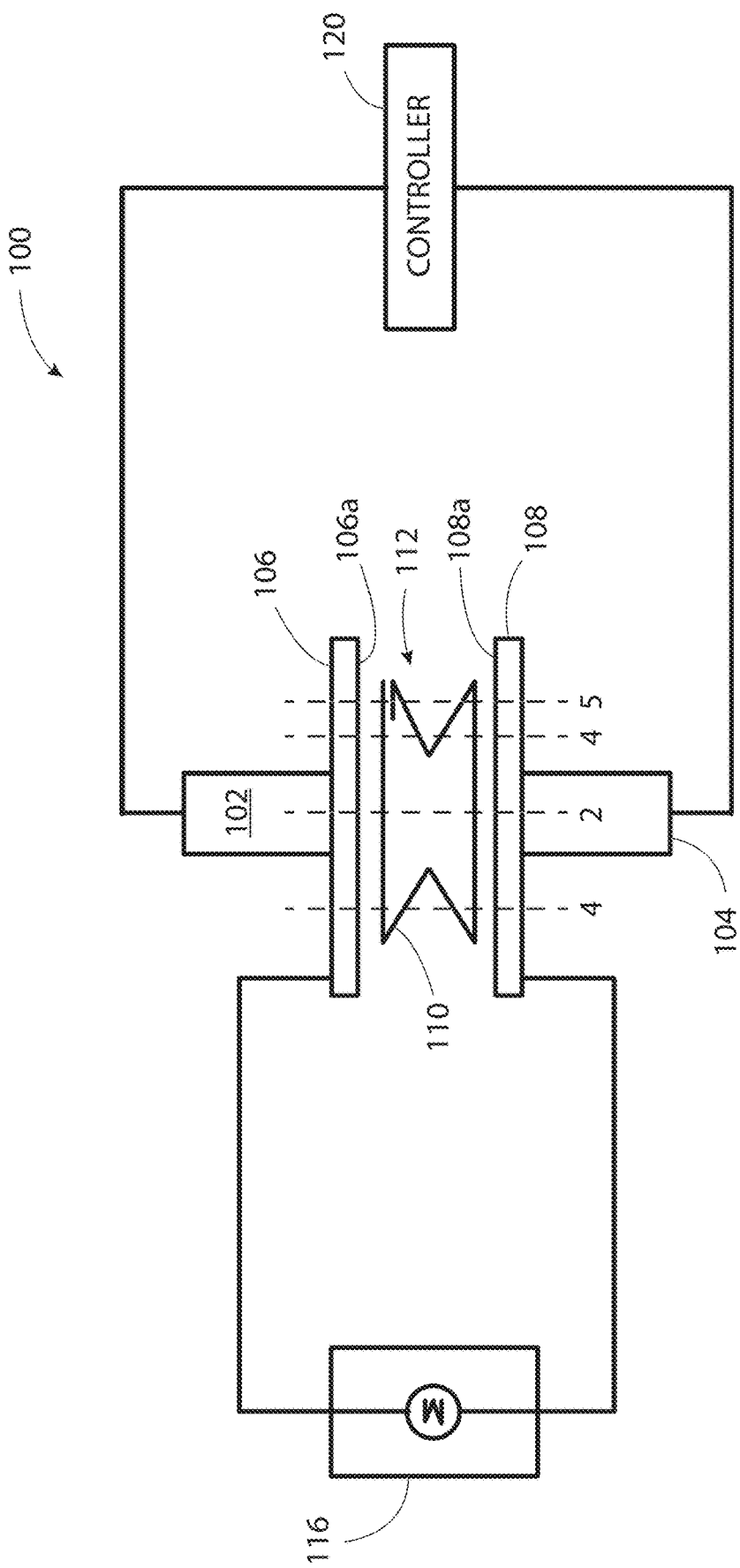
FIG. 1 is a diagram of an ultrasonic welding system for sealing together multiple layers of a part.
Figure 3A:
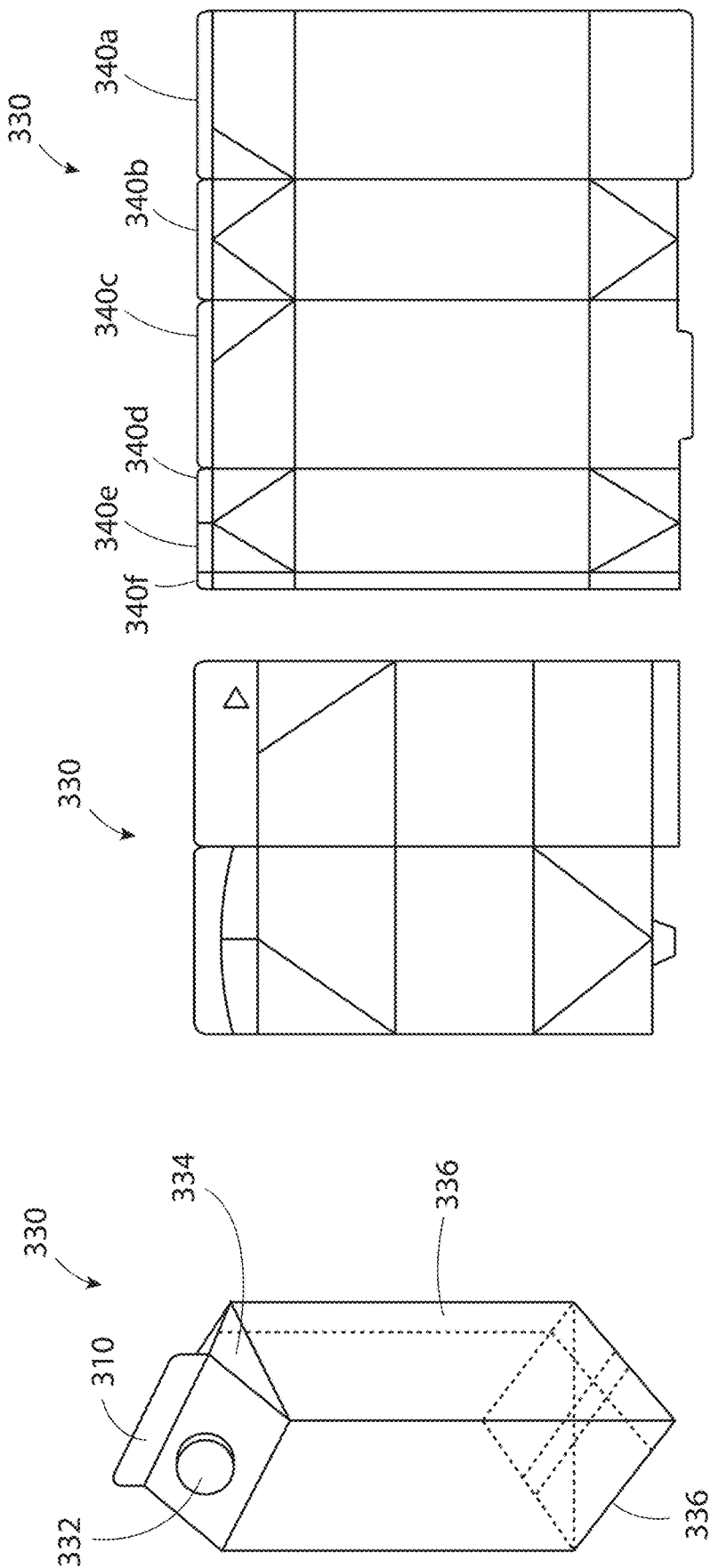
FIG. 3A illustrates a carton in various configurations showing the number of folds needed that creates the multiple layers in the Gable top of the carton.
Figure 4A:
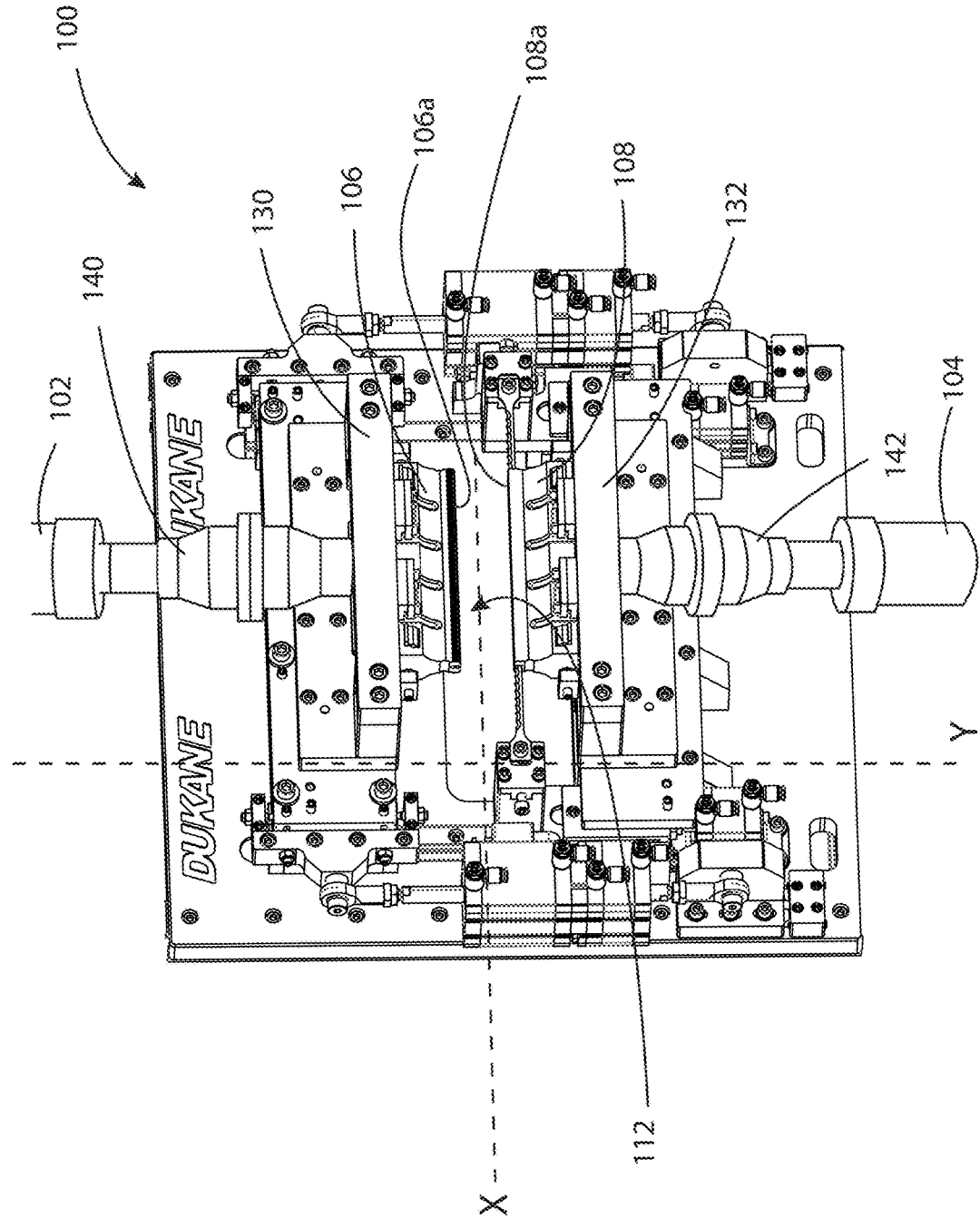
FIG. 4A illustrates an example ultrasonic welding stack having dual horns positioned directly opposite one another defining a gap between which the part is inserted to seal all the layers together.
Figure 4B:
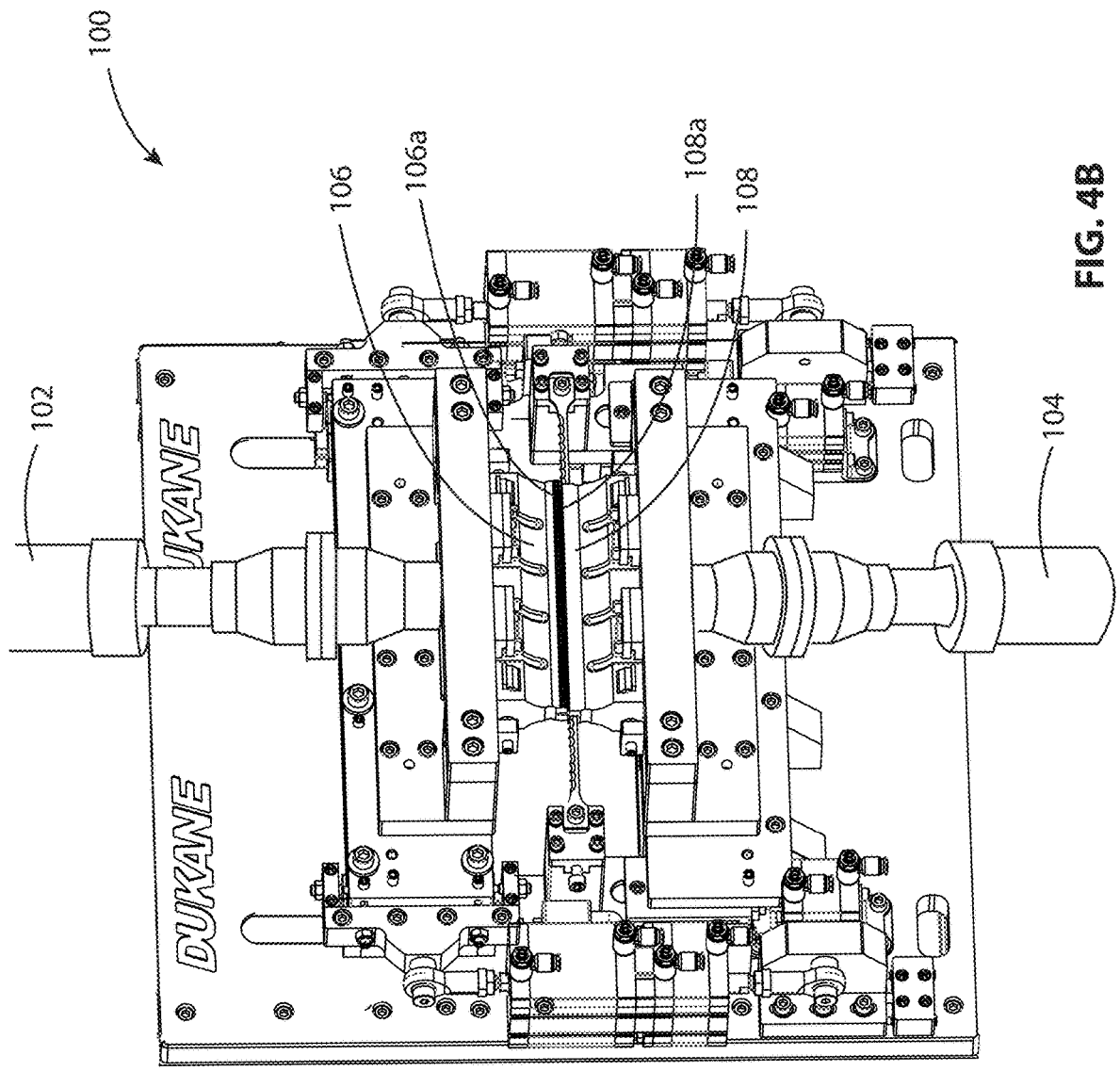
FIG. 4B illustrates the ultrasonic welding stack of FIG. 4A with the horns closed together. For ease of illustration to show the horns, the part to be sealed has been removed from between the horns.

FIG. 1 is an ultrasonic welding system 100 for sealing together multiple layers of a part 110. The system 100 includes two ultrasonic welding stacks (shown in FIGS. 4A and 4B) including a first transducer 102 and a second transducer 104. The system 100 includes a first horn 106 having a first welding surface 106a opposing a second welding surface 108a of a second horn 108 defining a gap 112 between the first and second welding surfaces 106a, 108a. The gap 112 is configured to receive therein the part 110 having a different number of layers to be sealed along a section of the part 110. The section of the part 110 to be sealed has been shown in exaggerated expanded and slightly unfolded form in FIG. 1 for ease of illustration to show the different number of layers present in this example part 100 from left to right. In reality, these layers would be pressed against one another when presented in the gap 112. Starting from the left in FIG. 1, as shown by the dashed lines, the first section of the part 110 to be sealed has four layers, followed by a second section having only two layers, followed by a third section having four layers, and finally ending by a fourth and last section having five layers. This type of interface is typically found in cartons having a Gable top such as shown in FIG. 3A. FIG. 3A shows an example carton in a fully assembled configuration, folded in half, and completely unfolded into a flat starting configuration. In the latter configuration, the complexity of the folds and layers can be seen in the top of the flattened carton, in which five sections 340a-f are present. When these are folded to form a Gable top 334, they produce an interface as shown in FIG. 1 with multiple layers. The area of the horn 106, 108 that contacts the part to be sealed is referred to herein as a "welding surface," meaning that it is a contacting surface of the horn that makes contact with the part to deliver via that surface the ultrasonic energy into an interface to be sealed of the part to weld (or seal) the interface. The ultrasonic energy passes through the horn away from the welding surface and into the part that is contact the welding surface of the corresponding horn. Each welding surface 106a, 108a of the horns 106, 108 makes physical contact with a different area of the part to be welded (the part's sealing interface), e.g., in the case of a Gable top, on either side of the Gable top to be formed when all the layers are sealed together.

Figure 3B:
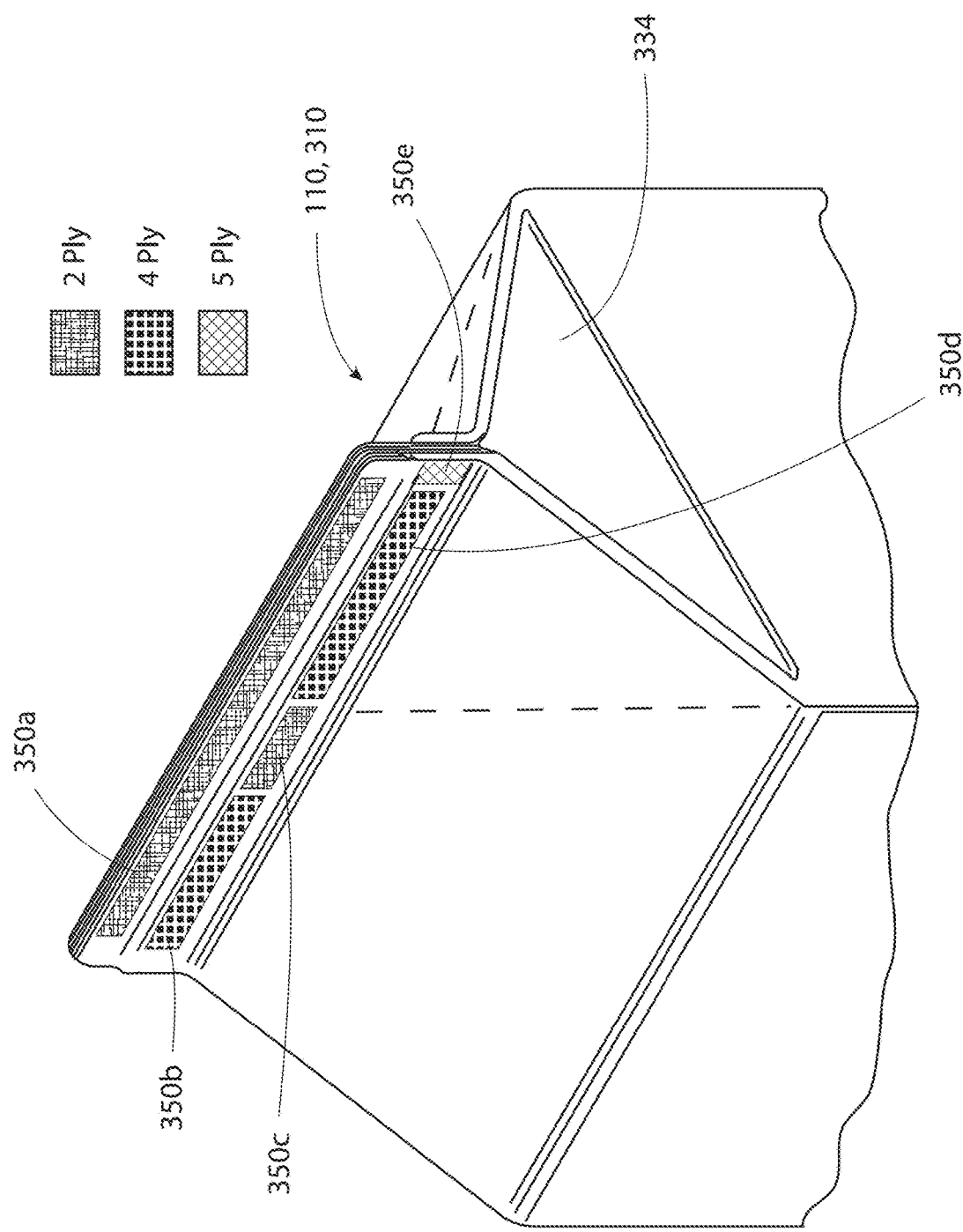
FIG. 3B illustrates a close-up view of the top of a Gable top showing the different layers present along the width, height, and depth dimensions of the Gable top.

The interface to be sealed can not only have different numbers of layers across its width but also across its height, as shown in FIG. 3B. Here, as the legend indicates, there are at least five sections 350a,b,c,d,e that need to be sealed together to form a hermetic seal. For example, along the elongated width dimension of the interface 110, 310 shown in FIG. 3B, there are four sections having, starting from left to right, four layers 350b, then two layers 350c, then four layers 350d again, terminated by five layers 350e. However, above these sections along a height dimension, there is an elongated section 350a having only two layers. Thus, taken along the height dimension (which is transverse to a longitudinal direction of the Gable top 310), there is only one section in the middle of the interface 310 where two layers are present in the area to be sealed. Everywhere else, there is a different number of layers above and below the corresponding sections of the interface 310 to be sealed. This type of Gable top 334 is particularly challenging to seal, because of the multi-dimensional changes in the number of layers across its width, height, and depth (due to the varying thickness of the different layers). Conventional adhesive-free methods are either time-consuming and require multiple passes along the interface, or simply do not produce a hermetic seal that can prevent all liquid from escaping. The carton 330 can also sometimes include a plastic spout 332 protruding from the Gable top to facilitating pouring. The Gable top 334 can be opened a la a milk carton for pouring out the liquid contents of the carton 334. The present disclosure is particularly well-suited for hermetically sealing Gable tops having many different layers in all three dimensions.

Another type of part that has a similar type of interface to be sealed is a pillow pack 230, illustrated in FIG. 2, which has tops or ends that resemble a Gable top. Pillow packs are usually first joined at a first seam running lengthwise along the pack, which presents an area that has multiple layers. The ends 210 of the pillow pack 230 also have multiple layers as shown by the legend. In this configuration, which is sometimes referred to as a 4-2-4-2-4, there are four layers in a first section of the end 230, followed by two layers, then four layers again, followed by two layers, and finally four layers. The different number of the layers are thus arranged across a longitudinal direction of the Gable top 210 of the pillow pack 230. Again, this type of part with a different number of layers presents a particular challenge to seal. The synchronized dual horn/stack configuration of the present disclosure can seal pillow packs so that they are airtight without any leaks. The pillow pack shown in FIG. 2 and the carton 330 shown in FIG. 3A can be composed of a polymeric film or a thermoplastic material.

Another type of part having interfaces that can be sealed using the inventions disclosed herein is a fluid-filled pouch having a valve or a pierceable sealing element that can be pierced, e.g., by a straw, such as described in U.S. Patent Application Publication No. 20040161171A1. An example system configured to seal using the ultrasonic technology disclosed herein a fluid-filled type of pouch is shown and described in connection with FIGS. 5A-5D. A popular type of pouch is sold in the U.S. under the brand CAPRISUN®. An example system configured to seal using the ultrasonic technology disclosed herein a part having a spout is shown and described in connection with FIGS. 6A-6C.

In liquid-filled pouches when a liquid is already present in the pouch before the pouch is sealed, the synchronized ultrasonic energy from the dual horns produces a vibration at the interface that pushes away liquids from the interface area, further contributing to creating a hermetic seal. In other words, a surprising benefit of the application of dual synchronized ultrasonic energy to a part filled with liquid is that the vibrations produced by the application of the energy from both sides of a to-be-sealed interface tends to vibrate away any droplets of liquid present around the interface, thereby allowing the layers of the interface to be sealed together without getting liquid trapped therebetween and creating opportunities for leaks. Microscopic leaks also present a health and spoliation hazard, allowing bacteria or other pathogens into the sealed pouch or mold to form around the seal. By creating a hermetic seal in one pass of the dual horns, wherein the vibrations produced by the application of ultrasonic energy from both sides of an opening of a liquid-filled pouch shake off liquid at the interface before being sealed, an additional advantage can be seen from the synchronized dual horn configuration disclosed herein.

Returning to FIG. 1, the system includes an actuator assembly 116 operatively coupled to the ultrasonic welding stack (FIGS. 4A and 4B) and configured to cause the first welding surface 106a of the first horn 106 to move relative to the second welding surface 108a of second horn 108. The movement of the horns 106, 108 together can be aided by corresponding frames 130, 132 to which the respective horns 106, 108 are coupled, which frames 130, 132 form part of the actuator assembly that moves the horns 106, 108 together and apart from one another. One movement of the horns 106, 108 together to clamp a part to be sealed and then apart following application of the ultrasonic energy to the part is referred to as a single pass or cycle. The actuator assembly 116 can include one or more motors, such as a servo motor. The two welding surfaces 106a, 108a are directly opposed one another and form mutually parallel planes that are orthogonal to an orientation of the horns 106, 108. The two horns 106, 108 can be seen as moving toward one another like a jaw that opens and closes such that the exposed end welding surfaces 106a, 108a thereof contact corresponding opposite surfaces of a part or part interface to be sealed. The corresponding ultrasonic energy from the transducers 102, 104 imparted to the horns 106, 108, which is synchronized in frequency and phase, is outputted along the same dimension in opposite directions. Each of the dual ultrasonic welding stacks can include an optional booster 140, 142, shown in FIG. 4A, which amplifies the energy emitted from the transducers 102, 104 before passing into the horn 106, 108. Again, the presence of the boosters 140, 142 is optional, and the configurations shown in FIGS. 5A and 6A lack a booster. In these configurations, the transducer 102, 104 is mounted directly to the horns 506, 508 (FIG. 5A) and 606, 608 (FIG. 6A).

A controller 120, which can be one or more controllers, is operative coupled to the ultrasonic welding stacks and to the actuator assembly 116. The controller 120 is configured to cause the actuator assembly 116 to urge the first and second welding surfaces 106a, 108a of the horns 106, 108 toward one another until contacting the part 110. A predetermined force can be applied to the horns 106, 108 to essentially clamp the part 110 between the welding surfaces 106a, 108b and keep the folded layers together. For example, the maximum force imparted by the horns on the part 110 can be set at 4500N, but will depend on the application including the thickness of the interface and the materials to be joined together. The controller 120 applies toward the part 110 a first ultrasonic energy via the output of the first horn 106 and a second ultrasonic energy via the output of the second horn 108 such that a frequency and a phase of the first and second ultrasonic energies are synchronized as the first and second ultrasonic energies are applied on both sides of the part 110 simultaneously, to thereby the seal the layers together, such as the layers 350*a,b,c,d,e* shown in FIG. 3B. As mentioned above, an example ultrasonic generator suitable to generate ultrasonic energy through a transducer into a horn is described in U.S. Pat. No. 7,475,801 and is commercially available from Dukane under any of the iQ™ line of ultrasonic generators.

Synchronization of two ultrasonic generators can be accomplished by providing a communication connection between the two generators so that their respective outputs to the transducers 102, 104 are synchronized in frequency and phase. Alternately, a generator such as the one described in the patent above can be modified to provide two outputs that are synchronized in frequency and phase and provided to a respective transducer 102, 104. The generators (whether separate or integrated with dual outputs) can be arranged in a master-slave relationship wherein one of the generators is assigned to be a master. The phase of the master generator is auto-locked to its ultrasonic stack's feedback using a Phase Lock Loop (PLL), and the master generator instructs the slave via the communication connection to mimic the same phase at the zero crossings (at 0 or 180 degrees) and ignore the slave's own phase and frequency feedback. This allows the slave's phase to drift in the same manner as the master. Phase drifts can occur, e.g., due to thermal effects, so by locking the phase of the slave to the master allows the phase (and therefore by implication the frequency corresponding to the zero crossings of the ultrasonic energy signal's phase) to be synchronized in both transducers 102, 104.

Figure 7:
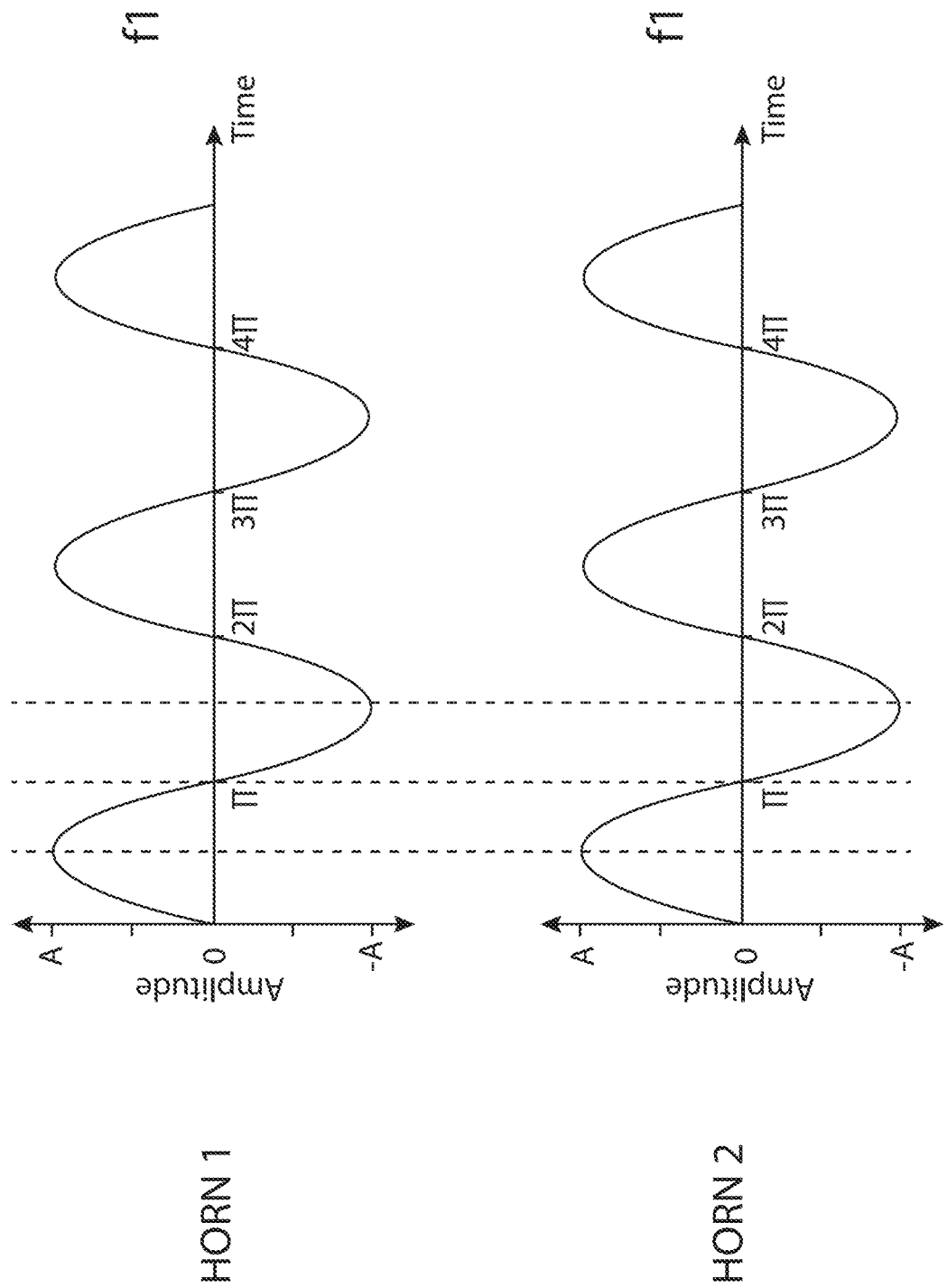
FIG. 7 are example waveforms of ultrasonic energy applied to a first and a second horn, which waveforms are synchronized in frequency and phase according to aspects of the present disclosure.

FIG. 7 illustrates example waveforms, which are not to scale, of synchronized ultrasonic energy applied to the first transducer 102 and to the second transducer 104. Here, synchronized refers to the energy having the same frequency, f1, and phase. The amplitude, A, may or may not be identical for both horns. Depending on the application and the thickness of the part closest to the horn 106, 108, a different amplitude can be applied through the first horn 106 relative to the second horn 108. Just as the frequency, f1, is matched in both horns 106, 108, so too the phase of both energies is time synchronized so that the zero-crossings and the peaks of the energy over time coincide at the same time as shown by the dashed lines in FIG. 7. The frequency, f1, of the energy generated in one horn 106 (or transducer 102) can be within 3 Hz of the energy generated in the other horn 108 (or transducer 104). Using two, synchronized horns halves the energy attenuation through multiple layers, such as when sealing a Gable top compared to a single horn setup. For example, in a single-stack configuration, the ultrasonic energy must pass through 4-5 layers of a Gable top, producing up to about a 50% attenuation or loss of ultrasonic energy/amplitude. By contrast, when using the synchronized dual horns according to the present disclosure, the energy from one horn only passes through 2 or 2.5 layers (the energy from the other side similarly passes through only half the number of layers compared to a single-stack configuration), and hence the energy/amplitude losses are only about 20-25%, producing a high quality weld or seal without burning the layers or creating any visual artifacts on the outer surface of the interface being sealed.

It has been found that the frequency of the ultrasonic energy delivered through both of the transducers 102, 104 to the horns 106, 108 is between about 15-70 kHz (e.g., ±10%). Particularly effective results are seen with 15 kHz, 20 kHz and 30 kHz. The frequency and phase of the ultrasonic energy delivered through both transducers 102, 104 to the horns 106, 108 to seal the part are synchronized in time so that peak amplitude of the ultrasonic energy is delivered simultaneously on both sides of the part to be sealed. The amplitude of the ultrasonic energy can be controlled independently on both transducers 102, 104. A frequency of 20-35 kHz is particularly suited for sealing smaller or thinner packaging, and higher frequencies can be used for sealing larger or thicker packaging.

An example "scrubbing" configuration is shown in FIGS. 5A-5D. In this configuration, there are two transducers 102, 104 synchronized in frequency and phase just as in the previous configurations, but the horns 506, 508 are positioned so that their sides come into contact to press against a to-be-sealed interface of a part, such as a thin film having a thickness in a range of 10-20 um, or a thin, non-woven film where the thickness can vary along the length of the interface. The variation in thickness can be ±2 um at unpredictable locations along the length of the interface. Thus, while the application of energy may be uniform, the thickness of the interface (e.g., which can be composed of just two layers being sealed together) can vary along the length of the interface being sealed together, creating opportunities for small leaks or uneven welding of the seal. The so-called scrubbing action leverages the tiny, mechanical Y-axis motions produced by the two horns 506, 508 vibrating relative to one another as the frequency- and phase-synchronized ultrasonic energy is imparted through the transducers 102, 104 to the horns 506, 508. These vibrations produce very short, rapid back and forth motions in the horns 506, 508 that resemble a scrubbing movement, which has been found to produce very high quality hermetic seals where the interface has a non-uniform thickness, such as when the interface is a thin film or non-woven film. The configuration shown in FIGS. 5A-5D also allow for gentler control of amplitude and force as applied to a thin interface, and a wider process window.

Figure 5A:
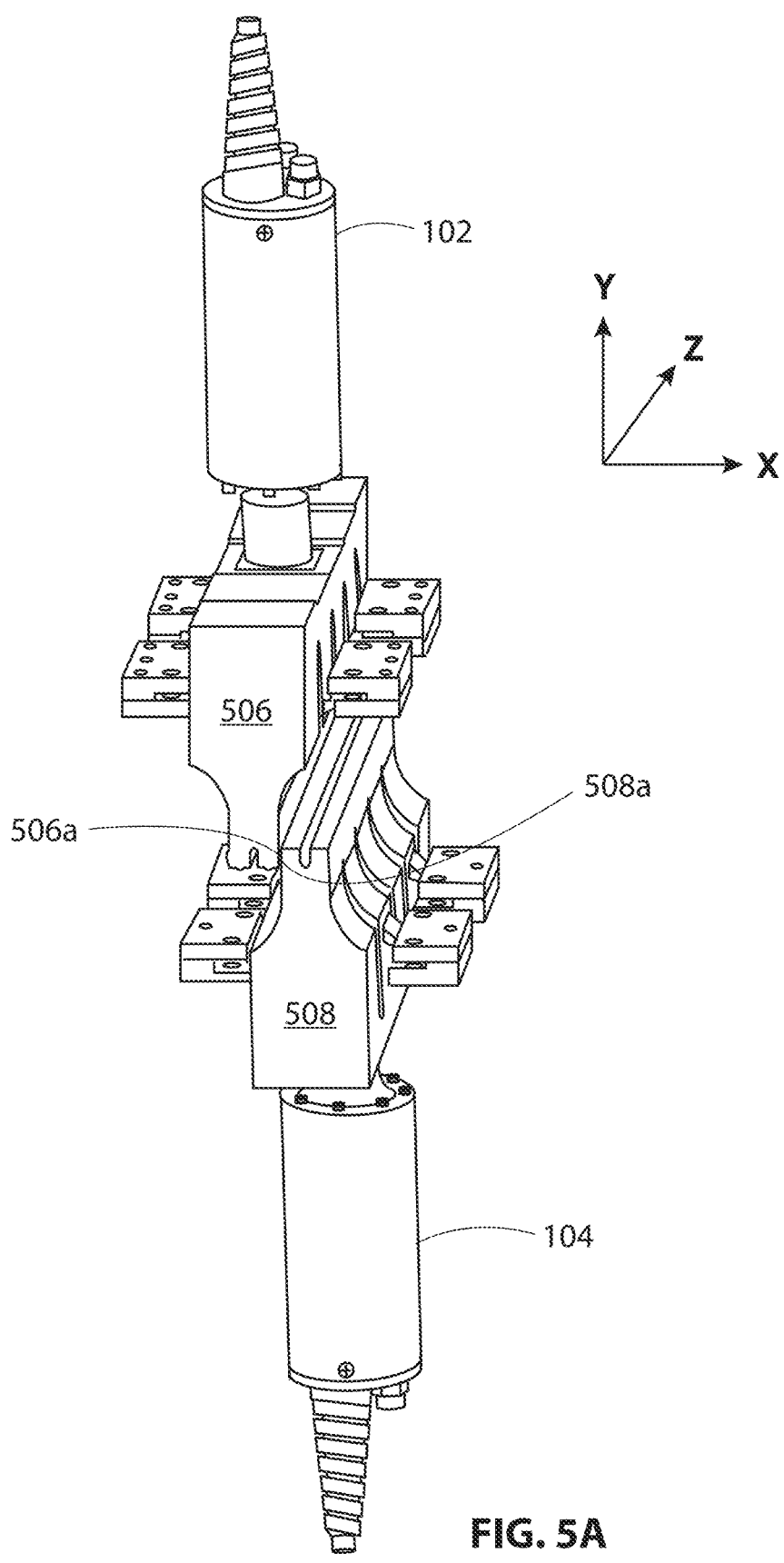
FIG. 5A illustrates a dual-stack setup configured to perform a "scrubbing" welding action using synchronized ultrasonic energy applied through a respective horn of each stack.

In FIG. 5A, two ultrasonic stacks, each including a transducer 102, 104 and a horn 506, 508. The horns 506, 508 are positioned adjacent one another so that their respective side welding surfaces 506*a*, 508*a* move toward one another. These welding surfaces 506*a*, 508*a* are parallel to the Y-Z plane and extend along a length along the Z axis. The ultrasonic energy is applied through the transducer 102 along the Y axis direction, and the ultrasonic energy through the second transducer 104 is applied in the opposite direction along the Y axis direction. The side surfaces 506*a*, 508*a* vibrate past one another as the part is positioned therebetween and the frequency- and phase-synchronized ultrasonic energy is applied through the horns 506, 508 simultaneously. Thin film or thin non-woven materials form a hermetic seal with only one pass of ultrasonic energy through the horns 506, 508. Only two horns 506, 508 and a single pass are required to produce a consistent, hermetic seal, free from burns or visual artifacts or microscopic leaks. While a thin film or non-woven material has been described in these examples, the scrubbing aspects disclosed herein also work with welding metal films, metal foils or thin metals, or any combination of thin film, non-woven material, or metals. For example, scrubbing is particularly effective at sealing metals together, but also is effective at sealing dissimilar materials together, e.g., a non-woven material to a metal film or foil.

Figure 5B:
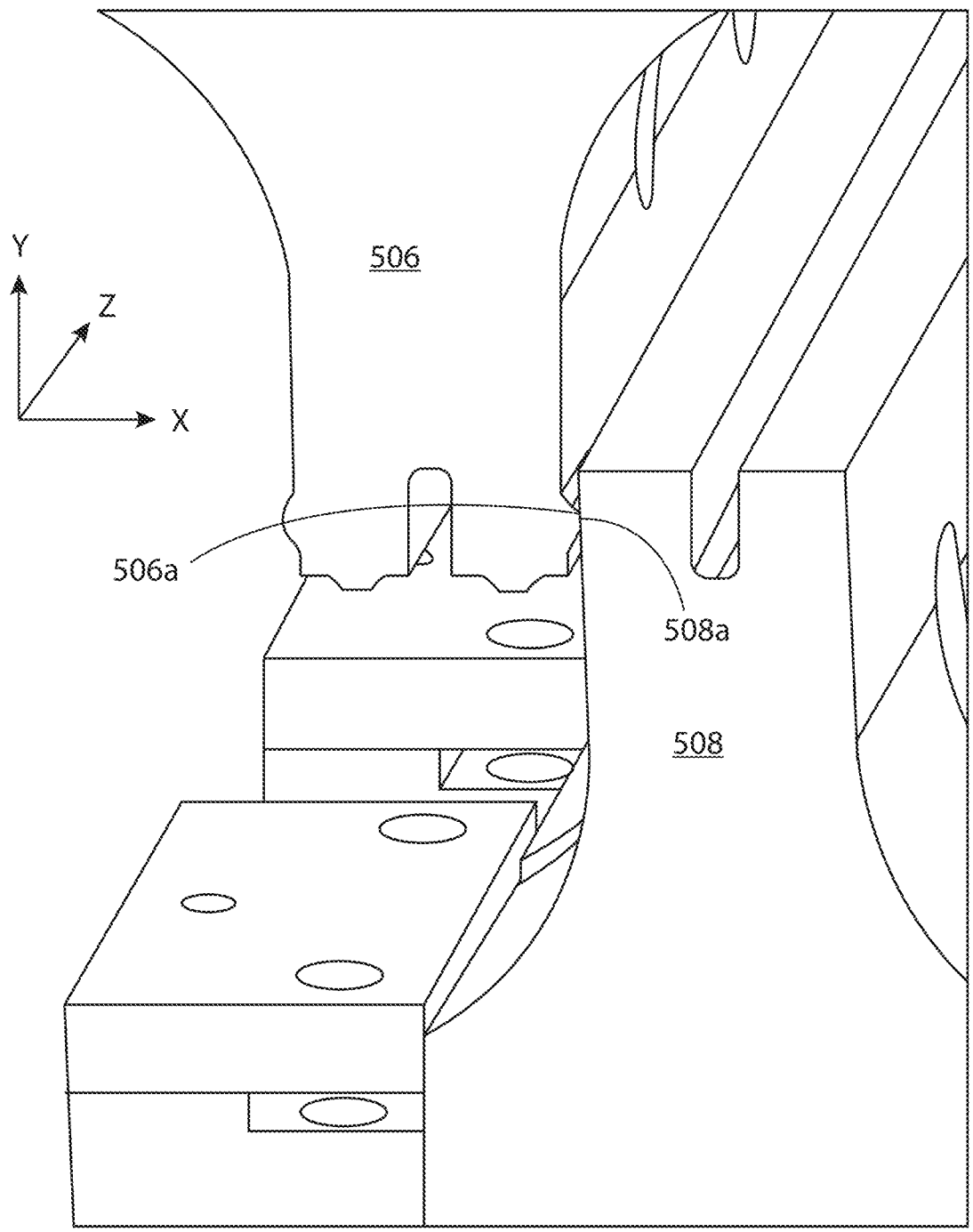
FIG. 5B is a cross-sectional view showing respective side welding surfaces of two horns abutting one another to seal a part interposed therebetween using synchronized ultrasonic energy applied through both horns simultaneously.
Figure 5C:
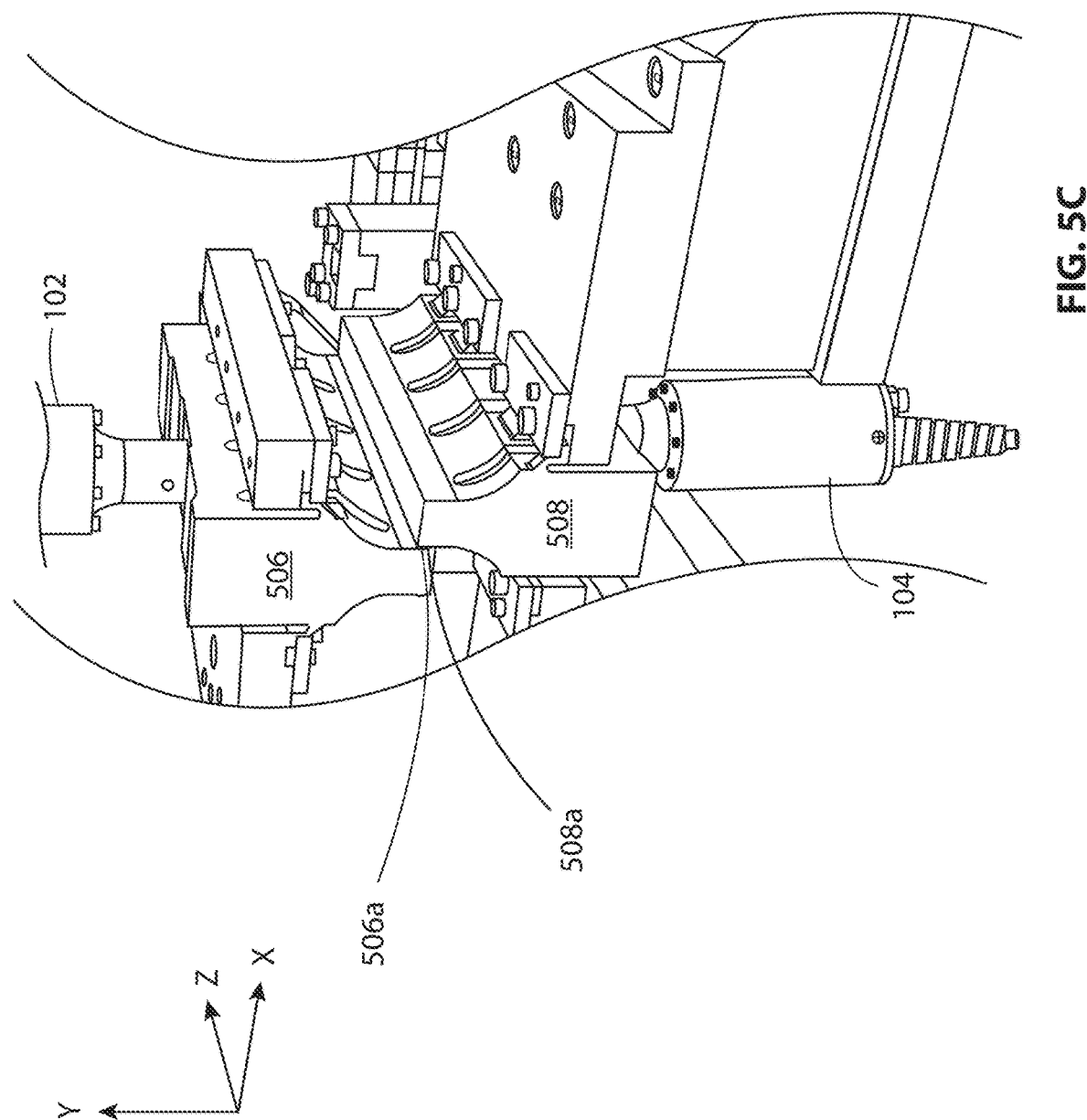
FIG. 5C illustrates an example configuration for carrying out a scrubbing-type welding action using synchronized ultrasonic energy applied to opposing horns simultaneously.
Figure 5D:
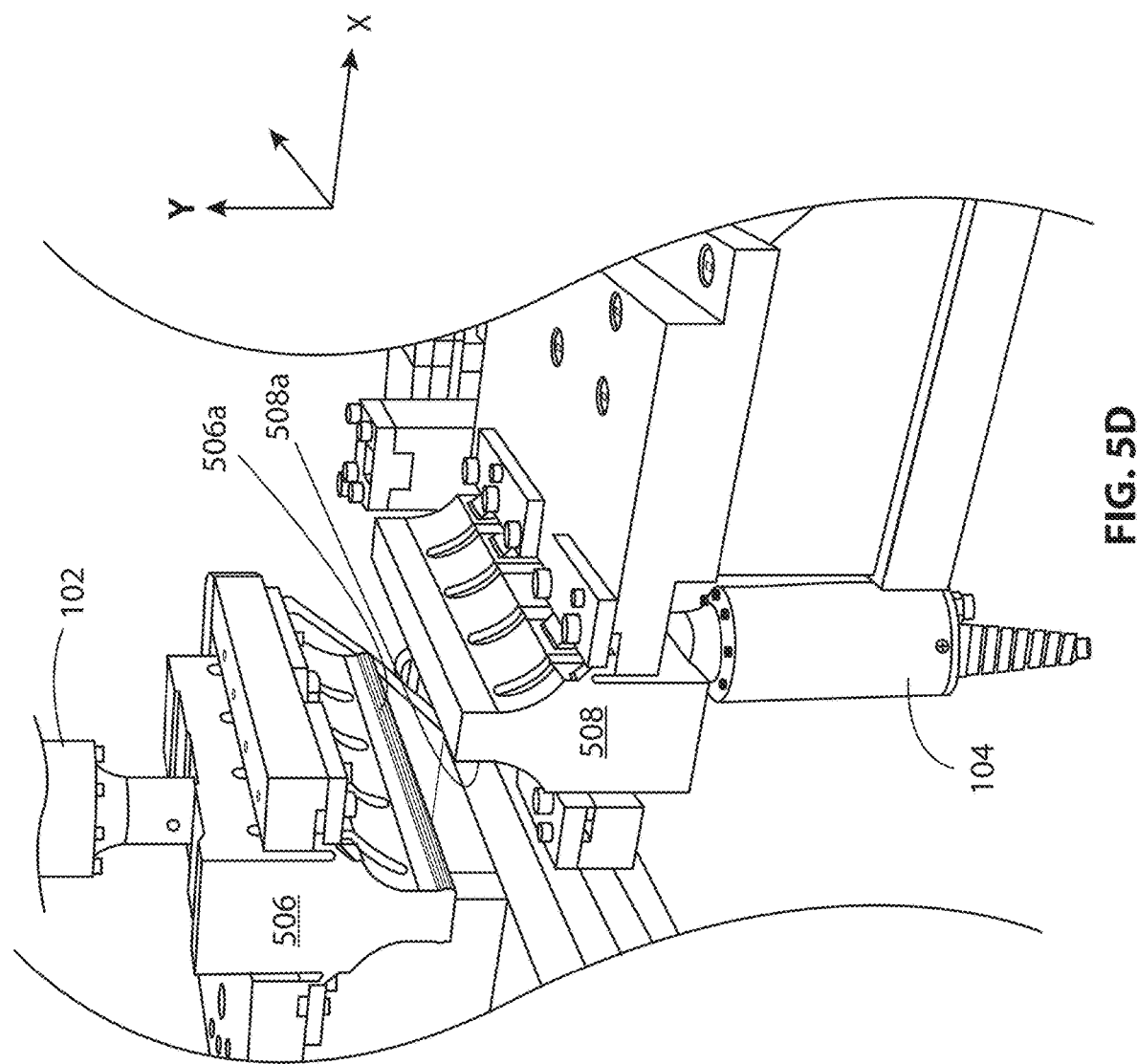
FIG. 5D illustrates the same configuration shown in FIG. 5C except with the two horns spaced a distance apart to receive in the gap therebetween an interface of a part to be sealed or joined together using synchronized ultrasonic energy applied to dual horns simultaneously.

In FIG. 5B, a close-up of the two side welding surfaces 506a, 508a can be seen of the horns 506, 508. The welding surface 506a extends away to form a smaller exposed surface area compared to the flat side welding surface 508a. In this way, the side welding surface 506a acts as a "scrubber" as it moves rapidly back and forth along the Y-axis direction under ultrasonic influence when a part 110 is positioned between the two horns 506, 508. An example configuration can be seen in FIG. 5C, where the horns 506, 508 are in contact with one another. The part 110, which for example can be a pouch having an open end that needs to be sealed, has its open end positioned between the horns 506, 508, which would "scrub" the two layers of the interface together as the ultrasonic energy is applied from opposite sides of the interface. The mechanical action coupled with the heat produced by the ultrasonic energies cooperate to produce a hermetic seal free from artifacts or microscopic leaks. FIG. 5D shows the horns 506, 508 spaced apart. The part's interface 110 is positioned in the gap between the two side welding surfaces 506a, 508a, which are urged toward one another along the X-axis direction until their side welding surfaces 506a, 508a contact with opposite sides of the interface 110. A force is applied to the horns 506, 508 while the ultrasonic energy is applied through the transducers 102, 104 and into the horns 506, 508, producing the tiny mechanical vibrations referred to as the scrubbing action along the melting of the interface 110 where the welding surfaces 506a, 508a press against it. Once the horns 506, 508 are retracted, a hermetic seal is present at the part's interface 110, requiring only one pass or movement of the horns 506, 508 and one application of the synchronized ultrasonic energies.

Another synchronized dual-horn configuration is shown in FIGS. 6A-6C, which is suitable for sealing parts having complex geometries, such as a plastic or metal spout for a liquid pouch, pillow, or container. Here, two transducers 102, 104 are positioned relative to a first contoured horn 606 and a second contoured horn 608 having an opening 612 (best seen in FIG. 6C) to receive therein a part 332 to be sealed. The end of the horns 606, 608 have a knurled surface 608b (best seen in FIG. 6B), to clamp around the part 332 (which can be a round spout, for example), which transition to a ribbed welding surface 608a that receives the round (or oval) part 332. The other horn 608 has the same welding surfaces, so that they press against one another, the part 332 is held in place and a uniform application of energy is evenly distributed around the part to produce a consistent weld. The contoured horns 606, 608 can be shaped to match the contour of any part's geometry, including round, oval, or any irregular geometry.

Figure 8A:
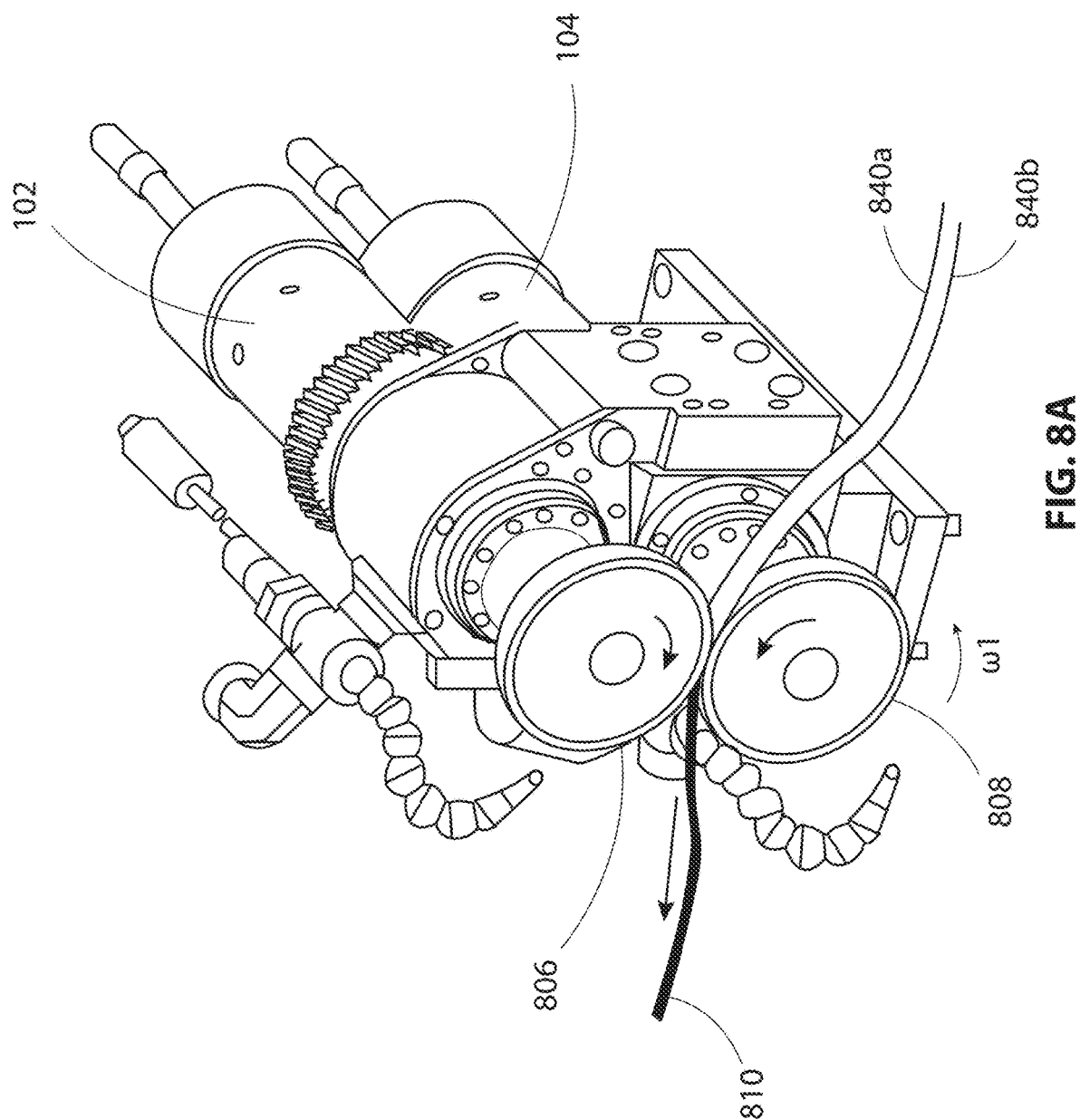
FIG. 8A is an illustration of a front view of dual rotary-horn configuration, whose frequency, phase, and angular speed is synchronized to weld or seal layers of a part, such as being composed of a non-woven material, together.
Figure 8B:
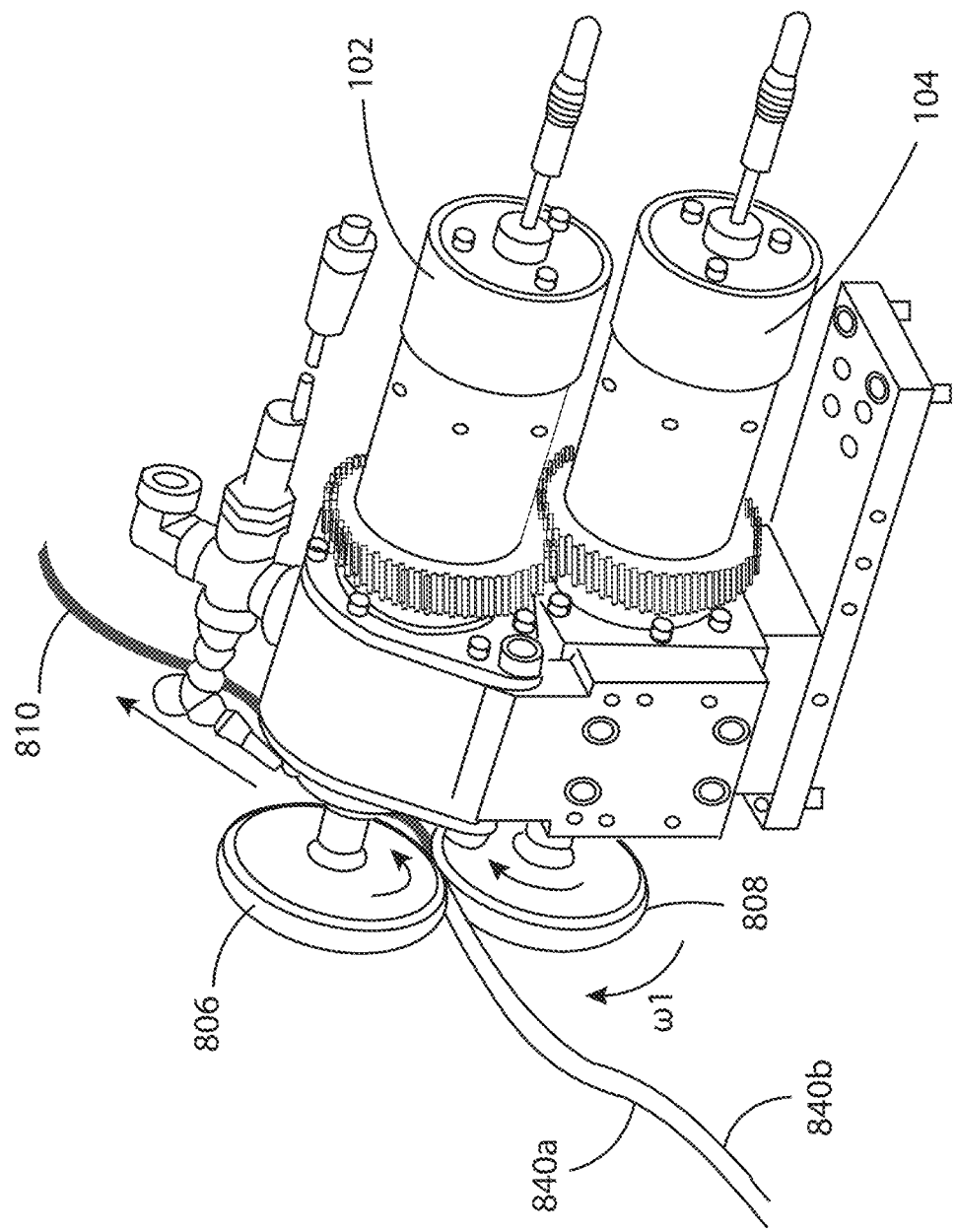
FIG. 8B is a rear view of the dual rotary-horn configuration shown in FIG. 8A.

A further dual-horn configuration is schematically illustrated in FIGS. 8A and 8B. Two horns 806, 808 are of the rotary type, and those familiar with the art of ultrasonic welding will appreciate rotary horns and how they are driven, the details of which are not pertinent to an understanding of this configuration. An example of a configuration including a rotary horn and a stationary anvil is shown in U.S. Pat. No. 10,479,025, granted Nov. 19, 2019, and entitled "Apparatus for fabricating an elastic nonwoven material," the entirety of which is incorporated herein by reference. According to the concepts disclosed herein, two rotary horns 806, 808 are proposed as shown in FIG. 8A, in which both horns 806, 808 contact both sides of a part 810 having multiple layers 840a, 840b (though more than two are contemplated), such as a non-woven material having multiple layers to be joined or sealed together, which passes between the two horns 806, 808 as the horns are rotating at the same angular speed, $\omega 1$. The frequency and phase of the respective ultrasonic energies being imparted to the horns 806, 808 are synchronized, as disclosed herein, producing a high quality seal or joining of the layers 840a, 840b of the part 810 in one pass through the horns 806, 808. A force can be applied to the layers 840a, 840b of the part 810 between the horns 806, 808, as the part 810 passes therebetween. For ease of illustration, the physical separation between the layers 840a, 840b has been exaggerated in FIGS. 8A and 8B to show how they are joined together by the dual rotary horns 806, 808, which are driven by respective transducers 102, 104. Each of the transducers 102, 104 is powered by corresponding outputs of one or more ultrasonic generators as described above that produce ultrasonic energy outputs to both transducers 102, 104 that is synchronized in both frequency and phase. Thus, in this configuration, and angular speed $\omega 1$ of the horns and frequency and phase of the ultrasonic energy applied to each horn are synchronously matched.

The layers 840a, 840b of the part 810 are drawn between the two horns 806, 808, which are rotating at the same angular speed as ultrasonic energy having the same frequency and phase is imparted to both horns 806, 808 simultaneously. By applying ultrasonic energy matched in frequency and phase to both horns 806, 808 simultaneously allows the amplitude of the energy to be reduced compared to a configuration having only one energized stack, which produces higher throughput (e.g., exceeding 2000 feet per minute) while expanding the process window.

An ultrasonic welding method for sealing together multiple layers (forming a to-be-sealed interface) of a part is also disclosed. The method includes moving a first welding surface of a first horn toward an opposing a second welding surface of a second horn to close a gap between the first welding surface and the second welding surface until the first and second welding surfaces contact a part, such as a part having a different number of layers along a section of the part to be sealed. Responsive to contacting the part, the method applies toward the section of the part between the two horns a first ultrasonic energy via an output of a first horn and a second ultrasonic energy via an output of a second horn such that a frequency and a phase of the first and second ultrasonic energies are synchronized as the first and second ultrasonic energies are applied on both sides of the part simultaneously, to thereby seal the layers together. The respective output tips of the first and second horns are arranged to point toward one another. Importantly, the closing and retraction of the horns occurs only one time to seal the interface without causing any burns, visual artifacts, or leaving any air or liquid leaks along the interface. By contrast, conventional approaches require multiple horn movements (e.g., three or more) to create a seal, which is time consuming and increases the risk of burning parts of the interface or creating undesirable visual artifacts particularly in thinner areas of the interface (e.g., when sealing a gable top).

Aspects of the present disclosure are also applicable to so-called far-field welding where the area to be welded is located a physical distance away from the horn output or surface from which the ultrasonic energy transitions from a solid substrate into the area outside the horn. In many applications, the location of the joint in regard to the area of horn contact can be critical, because the ultrasonic energy must travel through the material to reach the desired area of melt. Near-field and far-field welding refer to the distance that ultrasonic energy is transmitted from the point of horn contact to the joint interface. For example, when the distance between the horn output or surface and the joint interface to be welded is ¼" (6 mm) or less, it can be considered near field. By contrast, when the distance is greater than ¼" (6 mm), the weld can be considered far field. Whenever possible, it is always best to weld near field. This is because far-field welding requires higher than normal amplitudes, longer weld times, and higher forces to achieve a comparable near-field weld. Generally speaking, far-field welding is advised only for amorphous resins, which transmit energy better than semi-crystalline resins. However, with the two-horn configuration disclosed herein, the applications for far-field welding can be expanded because the energy is being applied from two sides of an interface simultaneously.

The dual horn aspects disclosed herein are also applicable to ultrasonic-assisted metal wire drawing processes or ultrasonic-assisted metal forming processes. Conventional metal drawing or forming processes contemplate using one source of ultrasonic energy applied to a hard steel die or the like as the wire or metal is pulled through the die. The pulling force is very high and eventually the die dulls and requires replacement. The present disclosure contemplates applying ultrasonic energy synchronized in frequency and phase to two sides of the die simultaneously as the wire or metal is drawn through the die by an external pulling force. The energy produces vibrations in the die, causing the die to act as a lubricant, thereby reducing the forces required to draw the wire through the die. The die will require replacement at a longer time interval, improving throughput for processes involving metal wire drawing or metal forming.

While some materials have been described herein as being suitable for sealing or welding using the synchronized dual-horn ultrasonic energy applications disclosed herein, including plastic and non-woven film, the present disclosure contemplates sealing or welding other types of same or dissimilar materials together, including pouches made from polyester printed to aluminum then laminated to polyethylene, metal including aluminum, metal foil, fabric, film, polyethylene-coated fiberboard or liquid paperboard, and the like.

Advantages of the systems and methods disclosed herein include:

Process speed increase: compared to conventional ultrasonic welding techniques that require multiple cycles and applications of ultrasonic energy, the systems and methods herein require only one cycle to create a hermetic seal for a variety of packaging, geometries, and materials.

Seal through same or dissimilar materials: a hermetic seal is formed through one application of synchronized ultrasonic energy imparted through two opposing horns, regardless of the material or its thickness uniformity.

Consistency, repeatability in weld results with wider process window parameters: Because two horns are applying the same ultrasonic energy (same frequency and phase) simultaneously, this effectively doubles the amplitude of the energy, enabling wider process window parameters compared to conventional techniques.

Housekeeping in production area, greener process (ultrasonic welding requires a lot less energy than heat seal technology): compared to heat-seal technologies that require application of heat energy to create a seal, ultrasonic energy by comparison utilizes less energy, creating a seal in a fraction of a second, such as 0.35 seconds or even faster.

Enable use of new materials, including bioplastics and material with poor welding compatibility: the dual horn setup synchronized to frequency and phase, and optionally coupled with the scrubbing action produced by the vibrations of the horns, significantly expands the available combinations of materials, interfaces, and geometries available for creating consistently high quality and hermetic seals or welds.

Waste and delay reduction; yield improvements: conventional techniques produce inconsistent seals, sometimes with tiny leaks, or can create burns or other visual artifacts requiring that some parts be discarded, lowering overall yield.

Narrower seal producing material savings: the interface or area to be sealed can be quite small compared to conventional techniques, allowing less overall material to be used. When millions of parts are being sealed or welded, a small reduction in material per part can yield a significant reduction in overall material.

Eliminate channel leaking: conventional techniques can produce tiny leaks that can create opportunities for air, pathogens, and/or mold to be present, but systems and methods of the present disclosure eliminate leaks without creating any visual artifacts and without causing burns at the interface of the seal.

Reducing manufacturing process complexity as for example welding spout to pouches can be done in one pass or cycle with this technology. By comparison, the same spout-to-pouch welding is currently being carried out in three passes or cycles with conventional ultrasonic welding technology.

Eliminate liquid or product contamination in the joint area due to ultrasonic energy (vibrations) from the ultrasonic stacks. It can also eliminate liquid content between two joints on vertical or horizontal packaging machines, where liquid is not desirable (e.g., in a brick carton assembly line).

What is claimed is:

1. An ultrasonic welding system for sealing together multiple layers of a part, the system comprising:
    a first ultrasonic welding stack including a first horn and a second ultrasonic stack including a second horn, the first horn having a first welding surface, the second horn having a second welding surface opposing the first welding surface to define a gap therebetween, wherein the gap is configured to receive therein the part to be sealed along a section of the part;
    an actuator assembly operatively coupled to the first and second ultrasonic welding stacks and configured to cause the first welding surface to move relative to the second welding surface;
    one or more controllers operatively coupled to the first and second ultrasonic welding stacks and to the actuator assembly, the one or more controllers operatively being configured to:
        cause the actuator assembly to urge the first and second welding surfaces of the first and second horns toward one another until contacting the part, and thereby apply toward the part a first ultrasonic energy via the first horn and a second ultrasonic energy via the second horn such that a frequency and a phase of the first and second ultrasonic energies are synchronized as the first and second ultrasonic energies are applied on both sides of the part simultaneously, to thereby the seal the part along the section.

2. The system of claim 1, wherein the frequency is between 15 kHz and 70 kHz.

3. The system of claim 1, wherein the part is a gable top having a different number of layers arranged across a longitudinal direction of the gable top.

4. The system of claim 1, wherein the part is a gable top having a different number of layers arranged across a direction transverse to a longitudinal direction of the gable top.

5. The system of claim 1, wherein an amplitude of the first ultrasonic energy differs from an amplitude of the second ultrasonic energy.

6. The system of claim 1, further comprising a first generator generating the first ultrasonic energy and a second generator generating the second ultrasonic energy, wherein the first generator is designated as a master generator that auto-locks feedback from the first ultrasonic welding stack using a phase lock loop and instructs the second generator that acts as a slave generator to match its own phase and frequency to those of the first generator.

7. The system of claim 1, wherein the part is composed of a material that includes a polymeric film, a thermoplastic material, a non-woven material, a metal foil, or a metal.

8. The system of claim 1, wherein the part is a pillow pack having an end portion having a different number of layers arranged across a longitudinal direction of the end portion.

9. The system of claim 1, wherein the part includes a different number of layers that includes, along the section of the part to be sealed, a first number of layers in a first portion of the section and a second number of layers in a second portion of the section, the first number differing from the second number.

10. An ultrasonic welding method for sealing together multiple layers of a part, the method comprising the steps of:
moving a first welding surface of a first horn toward an opposing a second welding surface of a second horn to close a gap between the first welding surface and the second welding surface until the first and second welding surfaces contact a part to be sealed along a section thereof;
responsive to contacting the part, applying to the part a first ultrasonic energy via the first horn and a second ultrasonic energy via the second horn such that a frequency and a phase of the first and second ultrasonic energies are synchronized as the first and second ultrasonic energies are applied on both sides of the part simultaneously, to thereby seal the part along the section, the first and second horns being arranged to point toward one another.

11. The method of claim 10, further comprising, responsive to sealing the layers together, retracting the first horn relative to the second horn to release the part.

12. The method of claim 10, wherein the frequency is between 15 kHz and 70 kHz.

13. The method of claim 12, wherein the moving is caused by a rotational movement of the first horn rotating at the same speed as a rotational movement of the second horn.

14. The method of claim 10, wherein an amplitude of the first ultrasonic energy differs from an amplitude of the second ultrasonic energy.

15. An apparatus having at least one seal applied by the method of claim 10.

16. The apparatus of claim 15, wherein the apparatus is a pillow pack or a carton or a pouch.

17. The apparatus of claim 1, wherein the part is a spout to be sealed to a pouch.

18. The apparatus of claim 1, wherein the first horn is a rotary horn and the second horn is a rotary horn, and the controller is further configured to rotate the first horn and the second horn at the same rotational speed while applying the synchronized first and second ultrasonic energies to the part.

19. The apparatus of claim 6, wherein the first generator includes a first output and a second output, the first output being operatively connected to a first transducer and the second output being operatively connected to a second transducer, the first transducer being operatively connected to the first horn and the second transducer being operatively connected to the second horn.

20. The apparatus of claim 7, wherein an area of the part to be joined by far-field welding is at least ¼ inch or 6 mm away from the first welding surface of the first horn or from the second welding surface of the second horn.

* * * * *